United States Patent
Liu et al.

(10) Patent No.: US 11,493,820 B2
(45) Date of Patent: Nov. 8, 2022

(54) COLOR ORGANIC PIGMENTS AND ELECTROPHORETIC DISPLAY MEDIA CONTAINING THE SAME

(71) Applicant: E Ink California, LLC, Fremont, CA (US)

(72) Inventors: Xin Liu, Fremont, CA (US); Hui Du, Milpitas, CA (US); Ming Wang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 17/382,353

(22) Filed: Jul. 22, 2021

(65) Prior Publication Data
US 2021/0349369 A1  Nov. 11, 2021

Related U.S. Application Data

(63) Continuation of application No. 16/997,041, filed on Aug. 19, 2020, now Pat. No. 11,099,452, which is a
(Continued)

(51) Int. Cl.
*G02F 1/167* (2019.01)
*G09G 3/34* (2006.01)
(Continued)

(52) U.S. Cl.
CPC ............ *G02F 1/167* (2013.01); *G02F 1/1675* (2019.01); *G02F 1/16757* (2019.01);
(Continued)

(58) Field of Classification Search
CPC ................. G02F 1/1675; G02F 1/1676; G02F 2001/1678; G09G 3/344
See application file for complete search history.

(56) References Cited

U.S. PATENT DOCUMENTS 3,639,133 A   2/1972   Linton
4,986,015 A   1/1991   Ackeret
(Continued)

FOREIGN PATENT DOCUMENTS

CN    103540162 A   1/2014
JP    2010044114 A   2/2010

OTHER PUBLICATIONS

Chao, Dongri et al., "Poly(ethylene oxide) Macromonomers IX. Synthesis and Polymerization of Macromonomers Carrying Styryl End Groups with Enhanced Hydrophobicity", Polymer Journal, vol. 23, No. 9, pp. 1045-1052, (Sep. 1991). Sep. 1, 1991.
(Continued)

*Primary Examiner* — Christopher E Leiby
(74) *Attorney, Agent, or Firm* — Ioannis Constantinides

(57) ABSTRACT

An electrophoretic display medium includes a front and a rear electrode, at least one of the front and rear electrodes being transparent, and an encapsulated dispersion fluid containing a plurality of pigments positioned between the front and rear electrode. The plurality of pigments includes a first and a second type of organic pigment particle. The first type of organic pigment particle has a first color and a first charge polarity. The second type of organic pigment particle has a second color different from the first color and a second charge polarity the same as the first charge polarity. At least one of the first and second types of organic pigment particle includes a silica coating and a polymeric stabilizer covalently bonded to the silica coating.

20 Claims, 1 Drawing Sheet

Related U.S. Application Data continuation of application No. 15/869,578, filed on Jan. 2, 2018, now Pat. No. 10,782,586.

(60) Provisional application No. 62/448,683, filed on Jan. 20, 2017.

(51) Int. Cl.
  *G02F 1/1675* (2019.01)
  *G02F 1/16757* (2019.01)
  *G02F 1/1676* (2019.01)

(52) U.S. Cl.
  CPC .......... *G09G 3/344* (2013.01); *G02F 1/1676* (2019.01); *G02F 2001/1678* (2013.01)

(56) References Cited

U.S. PATENT DOCUMENTS

| | | |
|---|---|---|
| 5,418,476 A | 5/1995 | Strauss |
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 5,945,491 A | 8/1999 | Matyjaszewski et al. |
| 6,017,584 A | 1/2000 | Albert et al. |
| 6,069,205 A | 5/2000 | Wang |
| 6,071,980 A | 6/2000 | Guan et al. |
| 6,111,022 A | 8/2000 | Matyjaszewski et al. |
| 6,121,371 A | 9/2000 | Matyjaszewski et al. |
| 6,124,411 A | 9/2000 | Matyjaszewski et al. |
| 6,137,012 A | 10/2000 | Fagan et al. |
| 6,153,705 A | 11/2000 | Corpart et al. |
| 6,162,882 A | 12/2000 | Matyjaszewski et al. |
| 6,191,225 B1 | 2/2001 | Barkac et al. |
| 6,197,883 B1 | 3/2001 | Schimmel et al. |
| 6,241,921 B1 | 6/2001 | Jacobson et al. |
| 6,545,797 B2 | 4/2003 | Chen et al. |
| 6,664,944 B1 | 12/2003 | Albert et al. |
| 6,788,452 B2 | 9/2004 | Liang et al. |
| 6,822,782 B2 | 11/2004 | Honeyman et al. |
| 6,859,302 B2 | 2/2005 | Liang et al. |
| 6,864,875 B2 | 3/2005 | Drzaic et al. |
| 6,866,760 B2 | 3/2005 | Paolini, Jr. et al. |
| 6,914,714 B2 | 7/2005 | Chen et al. |
| 6,922,276 B2 | 7/2005 | Zhang et al. |
| 6,972,893 B2 | 12/2005 | Chen et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,247,379 B2 | 7/2007 | Pullen et al. |
| 7,312,784 B2 | 12/2007 | Baucom et al. |
| 7,339,715 B2 | 3/2008 | Webber et al. |
| 7,385,751 B2 | 6/2008 | Chen et al. |
| 7,411,719 B2 | 8/2008 | Paolini, Jr. et al. |
| 7,426,074 B2 | 9/2008 | Tam et al. |
| 7,433,113 B2 | 10/2008 | Chopra et al. |
| 7,453,445 B2 | 11/2008 | Amundson |
| 7,492,505 B2 | 2/2009 | Liang et al. |
| 7,495,821 B2 | 2/2009 | Yamakita et al. |
| 7,535,624 B2 | 5/2009 | Amundson et al. |
| 7,667,684 B2 | 2/2010 | Jacobson et al. |
| 7,679,814 B2 | 3/2010 | Paolini, Jr. et al. |
| 7,684,108 B2 | 3/2010 | Wang et al. |
| 7,715,088 B2 | 5/2010 | Liang et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,839,563 B1 | 11/2010 | Luo et al. |
| 7,839,564 B2 | 11/2010 | Whitesides et al. |
| 7,910,175 B2 | 3/2011 | Webber |
| 7,952,790 B2 | 5/2011 | Honeyman et al. |
| 7,956,841 B2 | 6/2011 | Albert et al. |
| 7,982,941 B2 | 7/2011 | Lin et al. |
| 3,009,348 A1 | 8/2011 | Zehner et al. |
| 8,018,640 B2 | 9/2011 | Whitesides et al. |
| 3,040,594 A1 | 10/2011 | Paolini, Jr. et al. |
| 8,054,526 B2 | 11/2011 | Bouchard |
| 8,098,418 B2 | 1/2012 | Paolini, Jr. et al. |
| 8,119,233 B2 | 2/2012 | Chiruvolu et al. |
| 8,159,636 B2 | 4/2012 | Sun et al. |
| 8,213,076 B2 | 7/2012 | Albert et al. |
| 8,363,299 B2 | 1/2013 | Paolini, Jr. et al. |
| 8,363,306 B2 | 1/2013 | Du et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,462,423 B2 | 6/2013 | Farrand et al. |
| 8,466,852 B2 | 6/2013 | Drzaic et al. |
| 8,503,063 B2 | 8/2013 | Sprague |
| 8,576,470 B2 | 11/2013 | Paolini, Jr. et al. |
| 8,576,475 B2 | 11/2013 | Huang et al. |
| 8,593,721 B2 | 11/2013 | Albert et al. |
| 8,605,354 B2 | 12/2013 | Zhang et al. |
| 8,649,084 B2 | 2/2014 | Wang et al. |
| 8,670,174 B2 | 3/2014 | Sprague et al. |
| 8,704,756 B2 | 4/2014 | Lin |
| 8,717,664 B2 | 5/2014 | Wang et al. |
| 8,786,935 B2 | 7/2014 | Sprague |
| 8,797,634 B2 | 8/2014 | Paolini, Jr. et al. |
| 8,810,899 B2 | 8/2014 | Sprague et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,964,282 B2 | 2/2015 | Wang et al. |
| 9,013,781 B2 | 4/2015 | Zhou et al. |
| 9,013,783 B2 | 4/2015 | Sprague |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,251,736 B2 | 2/2016 | Lin et al. |
| 9,268,191 B2 | 2/2016 | Paolini, Jr. et al. |
| 9,279,906 B2 | 3/2016 | Kang |
| 9,285,649 B2 | 3/2016 | Du et al. |
| 9,293,511 B2 | 3/2016 | Jacobson et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,366,935 B2 | 6/2016 | Du et al. |
| 9,372,380 B2 | 6/2016 | Du et al. |
| 9,383,620 B2 | 7/2016 | Kaino et al. |
| 9,383,623 B2 | 7/2016 | Lin et al. |
| 9,423,666 B2 | 8/2016 | Wang et al. |
| 9,459,510 B2 | 10/2016 | Lin |
| 9,501,981 B2 | 11/2016 | Lin et al. |
| 9,513,527 B2 | 12/2016 | Chan et al. |
| 9,541,814 B2 | 1/2017 | Lin et al. |
| 9,671,668 B2 | 6/2017 | Chan et al. |
| 9,697,778 B2 | 7/2017 | Telfer et al. |
| 9,740,076 B2 | 8/2017 | Paolini, Jr. et al. |
| 9,759,980 B2 | 9/2017 | Du et al. |
| 9,812,073 B2 | 11/2017 | Lin et al. |
| 9,869,920 B2 | 1/2018 | Shuto et al. |
| 9,921,451 B2 | 3/2018 | Telfer et al. |
| 10,036,929 B2 | 7/2018 | Du et al. |
| 10,162,242 B2 | 12/2018 | Wang et al. |
| 10,209,556 B2 | 2/2019 | Rosenfeld et al. |
| 10,444,553 B2 | 10/2019 | Laxton |
| 10,514,583 B2 | 12/2019 | Zhang |

(56) References Cited

U.S. PATENT DOCUMENTS

| | | | |
|---|---|---|---|
| 10,782,586 B2 | 9/2020 | Liu et al. | |
| 2002/0188053 A1* | 12/2002 | Zang | G02F 1/1341 |
| | | | 524/474 |
| 2004/0150325 A1* | 8/2004 | Yamakita | G02F 1/1671 |
| | | | 313/500 |
| 2007/0268559 A1* | 11/2007 | Tam | G02F 1/167 |
| | | | 359/296 |
| 2008/0013156 A1* | 1/2008 | Whitesides | G02F 1/167 |
| | | | 427/214 |
| 2008/0042928 A1 | 2/2008 | Schlangen et al. | |
| 2008/0043318 A1 | 2/2008 | Whitesides et al. | |
| 2008/0048970 A1 | 2/2008 | Drzaic et al. | |
| 2008/0199687 A1* | 8/2008 | Chiruvolu | H05K 1/095 |
| | | | 428/323 |
| 2009/0225398 A1 | 9/2009 | Duthaler et al. | |
| 2010/0156780 A1 | 6/2010 | Jacobson et al. | |
| 2011/0043543 A1 | 2/2011 | Chen et al. | |
| 2012/0326957 A1 | 12/2012 | Drzaic et al. | |
| 2013/0127702 A1* | 5/2013 | Kaino | G02F 1/0102 |
| | | | 345/107 |
| 2013/0175479 A1* | 7/2013 | Du | G02F 1/167 |
| | | | 252/500 |
| 2013/0242378 A1 | 9/2013 | Paolini, Jr. et al. | |
| 2013/0244149 A1 | 9/2013 | Wang et al. | |
| 2013/0278995 A1 | 10/2013 | Drzaic et al. | |
| 2014/0011913 A1 | 1/2014 | Du et al. | |
| 2014/0055840 A1 | 2/2014 | Zang et al. | |
| 2014/0063589 A1* | 3/2014 | Zhou | C09C 3/12 |
| | | | 525/372 |
| 2014/0078576 A1 | 3/2014 | Sprague | |
| 2014/0177031 A1* | 6/2014 | Lin | G09G 3/344 |
| | | | 359/296 |
| 2014/0264294 A1* | 9/2014 | Holman | B29C 64/112 |
| | | | 425/375 |
| 2014/0340734 A1* | 11/2014 | Lin | G02F 1/167 |
| | | | 359/296 |
| 2014/0362213 A1 | 12/2014 | Tseng | |
| 2015/0005720 A1 | 1/2015 | Zang | |
| 2015/0118390 A1 | 4/2015 | Rosenfeld et al. | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0048054 A1 | 2/2016 | Danner | |
| 2016/0085132 A1* | 3/2016 | Telfer | G02F 1/167 |
| | | | 359/296 |
| 2016/0147127 A1* | 5/2016 | Shuto | G02F 1/1677 |
| | | | 359/296 |
| 2019/0004390 A1* | 1/2019 | Han | G02F 1/167 |

OTHER PUBLICATIONS

Koichi Ito et al., "Poly(ethylene oxide) Macromonomers. 7. Micellar Polymerization in Water", Macromolecules 1991, vol. 24, No. 9, pp. 2348-2354. Oct. 19, 1990.

Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277 Jan. 1, 2000.

Wang, J.S. et al; "Controlled/'Living' Radical Polymerization. Halogen Atom Transfer Radical Polymerization Promoted by a Cu(I)/Cu(II) Redox Process"; Macromolecules, vol. 28, No. 23; pp. 7901-7910 (1995). Jan. 1, 1995.

Wang et al.,Controlled/"living" radical polymerization. atom transfer radical polymerization in the presence of transition-metal complexes.,Journal of the American Chemical Society 1995 117 (20), 5614-5615 Jan. 1, 1995.

Beers, K. et al; "Atom Transfer Radical Polymerization of 2-Hydroxyethyl Methacrylate"; Macromolecules, vol. 32, No. 18; pp. 5772-5776 (1999). Jan. 1, 1999.

Zi-Qiang Wen et al., "Surface modification of organic pigment particles for microencapsulated electrophoretic displays"., Dyes and Pigments, vol. 92, Issue 1, pp. 554-562 (2011) Jan. 1, 2012.

Junjie Yuan et al., "Organic Pigment Particles Coated with Colloidal Nano-Silica Particles via Layer-by-Layer Assembly"., Chemistry of Materials, 2005, 17 (14), pp. 3587-3594 Jun. 17, 2005.

Korean Intellectual Property Office, PCT/US2018/012733, International Search Report and Written Opinion, dated May 4, 2018. May 4, 2018.

European Patent Office, EP Appl. No 18742096.3, Extended European Search Report, dated Oct. 31, 2019. Oct. 31, 2019.

* cited by examiner

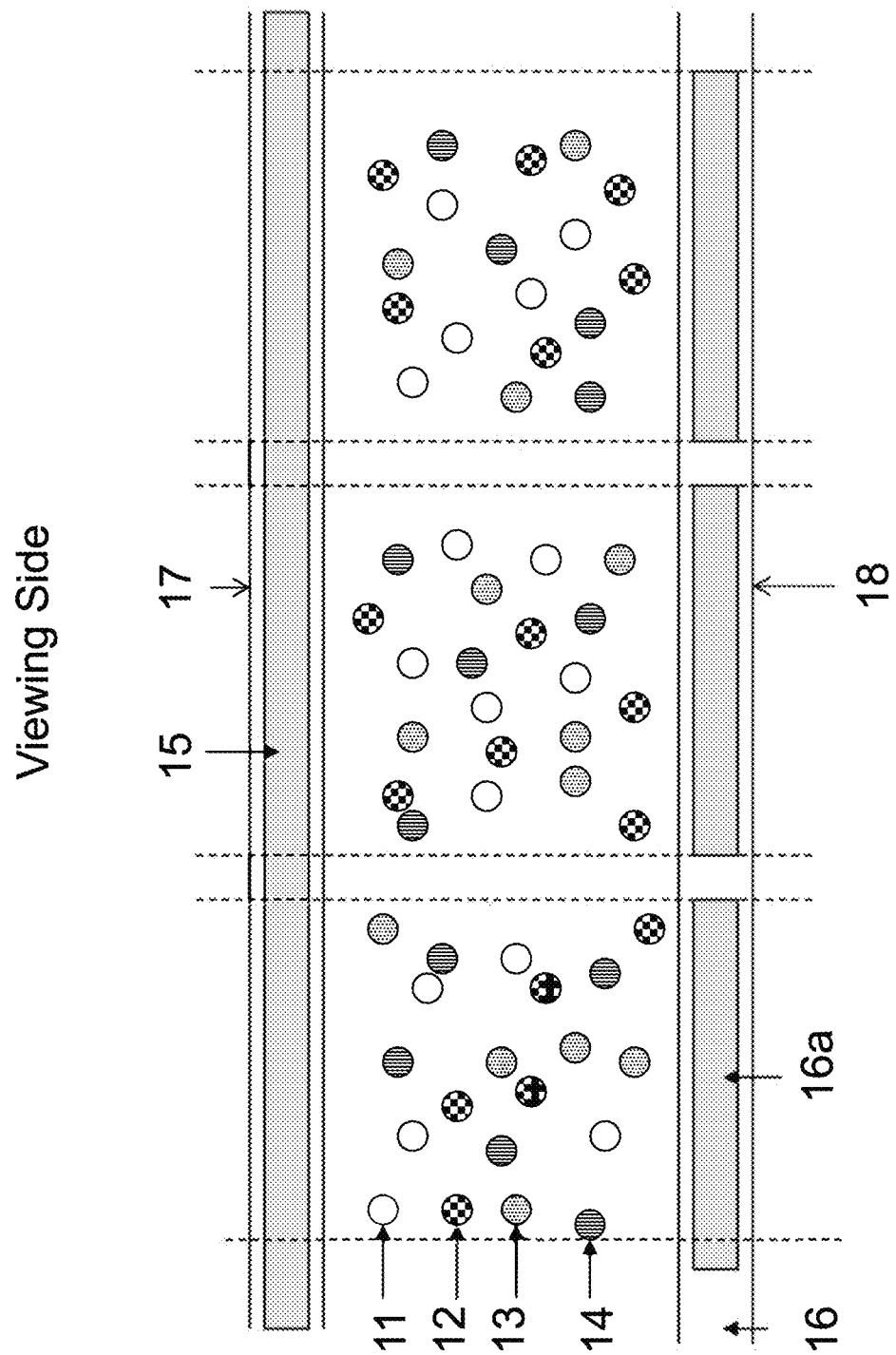

COLOR ORGANIC PIGMENTS AND ELECTROPHORETIC DISPLAY MEDIA CONTAINING THE SAME

CROSS-REFERENCE TO RELATED APPLICATION

This application is a continuation of U.S. patent application having Ser. No. 16/997,041 filed on Aug. 19, 2020, which is a continuation of U.S. patent application Ser. No. 15/869,578 filed on Jan. 12, 2018, now U.S. Pat. No. 10,782,586, which claims priority to and the benefit of U.S. Provisional Application having Ser. No. 62/448,683 filed on Jan. 20, 2017, the contents of which are incorporated by reference herein in their entireties.

FIELD OF THE INVENTION

This invention relates to organic pigments used in electrophoretic display media. More specifically, in one aspect this invention relates to electrophoretic systems containing multiple differently colored organic pigments having similar charge polarity.

BACKGROUND OF INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, such as black and white, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. Some particle-based electrophoretic displays are stable not only in their extreme black and white states but also in three or more states, such as multi-color displays having three or more colors. For convenience the term "bistable" may be used herein to cover display elements having two or more display states.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

However, the service life of encapsulated electrophoretic displays, is still lower than is altogether desirable. It appears that this service life is limited by factors such as the tendency of particles to aggregate into clusters which prevent the particles completing the movements necessary for switching of the display between its optical states. The physical properties and surface characteristics of electrophoretic particles can be modified by adsorbing various materials onto the surfaces of the particles, or chemically bonding various materials to these surfaces. For example, in an electrophoretic display that contains organic pigments, monomers having different chemical groups may form polymer coatings on the pigments by dispersion polymerization and the coatings may react with a charge control agent to provide colored particles of varying charge strength. It has been observed, however, that as the number of colors increase, some of the differently colored polymer-coated pigments may have difficulty separating from one another due to the similarity of the coated polymer structures. An alternative approach is to use inorganic color pigment, but the color strength and brightness of organic pigments is superior to inorganic pigments. Because organic pigments are preferred, there is a need for improved color electro-optic displays that include electrophoretic media containing a plurality of colored organic particles.

SUMMARY OF THE INVENTION

According to one aspect of the present invention, an electrophoretic display medium comprises a front and a rear electrode and an encapsulated dispersion fluid containing a plurality of pigments positioned between the front and rear electrode. At least one of the front and rear electrodes may be transparent. The plurality of pigments comprise a first and a second type of organic pigment particle. The first type of organic pigment particle may have a first color and a first charge polarity. The second type of organic pigment particle may have a second color different than the first color and a second charge polarity that is the same as the first charge polarity. At least one of the first and second types of organic pigment particle includes a silica coating and a polymeric stabilizer bonded to the silica coating.

These and other aspects of the present invention will be apparent in view of the following description.

BRIEF DESCRIPTION OF THE FIGURES

The drawing FIGURE depicts one implementation in accord with the present concepts, by way of example only, not by way of limitation.

The FIGURE depicts an electrophoretic display device according to one embodiment of the present invention.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

According to one embodiment of the present invention, an electrophoretic display medium is provided that may be incorporated into an electro-optic display. The electro-optic display may comprise a front and a rear electrode, at least one of the front and rear electrodes being transparent, and an encapsulated dispersion fluid containing a plurality of pigments positioned between the front and rear electrode. The plurality of pigments may comprise a first and a second type of organic pigment particle. The first type of organic pigment particle may have a first color and a first charge polarity, and the second type of organic pigment particle may have a second color and a second charge polarity. The first color and second color may also be different, while the first and second charge polarity are the same.

The electrophoretic display medium may optionally further comprise a third type of organic pigment having a third color and third charge polarity, both the third color and third charge polarity being different than the first and second color and charge polarity. Each of the first, second, and third types of organic pigment particles may include, but are not limited to, CI pigment PR 254, PR122, PR149, PG36, PG58, PG7, PB28, PB15:1, PB15:2, PB15:3, PB15:4, PY83, PY138, PY150, PY 151, PY154, PY155 or PY20, as well as other commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Furthermore, the color of the first, second, and third types of organic pigment particles may be independently colored red, green, blue, cyan, magenta, or yellow, for example.

In addition to the colors, the particles may have other distinct optical characteristics, such as optical transmission, reflectance, luminescence or, in the case of displays intended for machine reading, pseudo-color in the sense of a change in reflectance of electromagnetic wavelengths outside the visible range.

According to the various embodiments of the present invention, at least one of the first and second types of organic pigment particles include a silica coating to which a polymeric stabilizer may be bonded. In one embodiment, the polymeric stabilizer may comprise a polymer containing a silane coupling group and the silane group is covalently bonded to the silica coating. In another embodiment, the polymeric stabilizer may be ionically bonded to a silane coupling agent having a silane group, and the silane group may be covalently bonded to the silica coating.

Referring now specifically to the FIGURE, the electrophoretic fluid may comprise four types of particles dispersed in an encapsulated dispersion fluid, such as a dielectric solvent or solvent mixture. For ease of illustration, the four types of pigment particles may be referred to as the first type (11), the second type (12), the third type (13) and the fourth type (14) of particles, as shown in the FIGURE. However, with only four types of pigment particles, a display device utilizing the electrophoretic fluid may display at least five different color states, which leads to a full color display. The dispersion fluid may be encapsulated according to any method known to those of skill in the art, e.g. microcapsules, microcells, or a polymer matrix, and to any size or shape, such as spherical, for example, and may have diameters in the millimeter range or the micron range, but are preferably from about ten to about a few hundred microns.

Various coating methods may be employed to provide the organic pigment particle with a silica coating. For example, the coating method described in U.S. Pat. No. 3,639,133, the contents of which are incorporated herein by reference in its entirety, provides an example of a coating method. Prior to coating the organic pigment particles, the particles may be prepared by first de-agglomerating and homogenizing an aqueous slurry of the organic pigment particles using various known methods, such as sonication, ball milling, jet milling, etc. A dispersant may be added to the aqueous slurry to maintain de-agglomeration of the pigment particles. In one process, the organic pigment particles are dispersed in a solution of ethanol and tetraethyl orthosilicate and react at room temperature for 20 hrs under basic conditions to form a generally uniform coating of silica over the particles. The coating is preferably 0.5 to 10 nm thick, more preferably 1 to 5 nm.

After the deposition of the silica coating is complete, the pH of the reaction mixture may be reduced below about 4, and preferably to about 3, before the silica-coated particles are separated from the reaction mixture. The reduction in pH is conveniently effected using sulfuric acid, although other acids, for example, nitric, hydrochloric and perchloric acids, may be used. The particles are conveniently separated from the reaction mixture by centrifugation. Following this separation, it is not necessary to dry the particles. Instead, the silica-coated particles can be readily re-dispersed in the medium, typically an aqueous alcoholic medium, to be used for the next step of the process for the formation of the polymeric stablizer on the particles. This enables the silica-coated pigment particles to be maintained in a non-agglomerated and non-fused form as they are subjected to the processes for attachment of polymerizable or polymerization-initiating groups, thus allowing for thorough coverage of the pigment particle with such groups, and preventing the formation of large aggregates of pigment particles in the microcapsules which will typically eventually be formed from the silica-coated pigment. Preventing the formation of such aggregates is especially important when the silica-coated pigment is to be used in small microcapsules (less than about 100 µm in diameter), and such small microcapsules are desirable since they reduce the operating voltage and/or switching time of the electrophoretic medium.

According to a first embodiment of the present invention, the polymeric stabilizer may be derived from one or more monomers or macromonomers using various polymerization techniques known by those of skill in the art. For example, the polymeric stabilizer on the silica coated organic pigment particles may be obtained by random graft polymerization (RGP), ionic random graft polymerization (IRGP), and atom transfer radical polymerization (ATRP), as described in U.S. Pat. No. 6,822,782, the contents of which are incorporated herein by reference in its entirety. As used herein throughout the specification and the claims, "macromonomer" means a macromolecule with one end-group that enables it to act as a monomer.

Suitable monomers for forming the polymeric stabilizer may include, but are not limited to, styrene, alpha methyl styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydroxyethyl acrylate, 2-hydroxyethyl methacrylate, dimethylaminoethyl methacrylate, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate, 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate, and 2,2,3,3,4,4,4-heptafluorobutyl methacrylate or the like. The macromonomer may contain a terminal functional group selected from the group consisting of an acrylate group, a vinyl group, or combinations thereof.

In the processes of the present invention, polymerizable monomers or macromonomers may be attached to the surface of the silica-coated pigment particles using any bifunctional compound having one group capable of bonding covalently to the silica coating and another group capable of covalently or ionically bonding to the monomers or macromonomers. In one example, the compound may be a silane having at least one polymerizable group, such as the polymerizable monomers listed above (e.g. 3-(trimethoxysilyl) propyl methacrylate).

The polymeric stabilizer may be formed from a reactive and polymerizable monomer or macromonomer which adsorbs, becomes incorporated or is chemically bonded to the bifunctional compound used to bridge the silica coating and the polymeric stabilizer. The polymeric stabilizer determines the particle size and colloidal stability of the system and preferably has a long polymeric chain which may stabilize the composite pigment particles in a hydrocarbon solvent.

In describing the reagents used to provide the desired polymerizable or initiating functionality, we do not exclude the possibility that the polymeric stabilizer may be "bifunctional." For example, polymerization initiators are known (such as 4,4'-azobis(4-cyanovaleric acid)) having more than one ionic site, and such initiators may be used in the present process. Also, as previously noted, a bifunctional compound may have the form of a macromonomer containing repeating units having the capacity to bond to the particle surface and other repeated units having the desired polymerizable or initiating functionality, and such macromonomeric bifunctional compounds may form polymeric stabilizers that will normally contain multiple repeating units of both these types.

The preferred class of functional groups for bonding to silica-coated pigments are silane coupling groups, especially trialkoxy silane coupling groups. One especially preferred reagent for attaching a polymerizable group to titania and similar pigments is the aforementioned 3-(trimethoxysilyl) propyl methacrylate, which is available commercially from Dow Chemical Company, Wilmington, Del. under the trade name Z6030. The corresponding acrylate may also be used.

One type of macromonomer for use as a polymeric stabilizer may be acrylate terminated polysiloxane, such as Gelest, MCR-M11, MCR-M17, or MCR-M22, for example. Another type of macromonomers which is suitable for the process is PE-PEO macromonomers, as shown below:

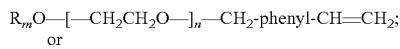
or

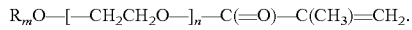

The substituent R may be a polyethylene chain, n is 1-60 and m is 1-500. The synthesis of these compounds may be found in Dongri Chao et al., Polymer Journal, Vol. 23, no. 9, 1045 (1991) and Koichi Ito et al, Macromolecules, 1991, 24, 2348. A further type of suitable macromonomers is PE macromonomers, as shown below:

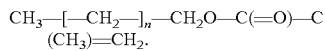

The n, in this case, is 30-100. The synthesis of this type of macromonomers may be found in Seigou Kawaguchi et al, Designed Monomers and Polymers, 2000, 3, 263.

When choosing the bifunctional compound to provide polymerizable or initiating functionality on the particle, attention should be paid to the relative positions of the two groups within the reagent. As should be apparent to those skilled in polymer manufacture, the rate of reaction of a polymerizable or initiating group bonded to a particle may vary greatly depending upon whether the group is held rigidly close to the particle surface, or whether the group is spaced (on an atomic scale) from that surface and can thus extend into a reaction medium surrounding the particle, this being a much more favorable environment for chemical reaction of the group. In general, it is preferred that there be at least three atoms in the direct chain between the two functional groups; for example, the aforementioned 3-(trimethoxysilyl)propyl methacrylate provides a chain of four carbon and one oxygen atoms between the silyl and ethylenically unsaturated groups, while the aforementioned 4-vinylaniline separates the amino group (or the diazonium group, in the actual reactive form) from the vinyl group by the full width of a benzene ring, equivalent to about the length of a three-carbon chain.

In any of the processes described above, the quantities of the reagents used (e.g., the organic core pigment particles, the silica shell material and the material for forming the polymeric stabilizers) may be adjusted and controlled to achieve the desired organic content in the resulting composite pigment particles. Furthermore, the processes of the present invention may include more than one stage and/or more than one type of polymerization.

As noted above, the particles made according to the various embodiments of the present invention are dispersed in an encapsulation fluid. It is desirable that the polymeic stabilizer be highly compatible with the encapsulated fluid. In practice, the suspending fluid in an electrophoretic medium is normally hydrocarbon-based, although the fluid can include a proportion of halocarbon, which is used to increase the density of the fluid and thus to decrease the difference between the density of the fluid and that of the particles. Accordingly, it is important that the polymeric stabilizer formed in the present processes be highly compatible with the encapsulated fluid, and thus that the polymeric stabilizer itself comprise a major proportion of hydrocarbon chains; except for groups provided for charging purposes, as discussed below, large numbers of strongly ionic groups are undesirable since they render the polymeric stabilizer less soluble in the hydrocarbon suspending fluid and thus adversely affect the stability of the particle dispersion. Also, as already discussed, at least when the medium in which the particles are to be used comprises an aliphatic hydrocarbon suspending fluid (as is commonly the case), it is advantageous for the polymeric stabilizer to have a branched or "comb" structure, with a main chain and a plurality of side chains extending away from the main chain. Each of these side chains should have at least about four, and preferably at least about six, carbon atoms. Substantially longer side chains may be advantageous; for example, some of the preferred polymeric stabilizers may have lauryl ($C_{12}$) side chains. The side chains may themselves be branched; for example, each side chain could be a branched alkyl group, such as a 2-ethylhexyl group. It is believed (although the invention is in no way limited by this belief) that, because of the high affinity of hydrocarbon chains for the hydrocarbon-based suspending fluid, the branches of the polymeric stabilizers spread out from one another in a brush or tree-like structure through a large volume of liquid, thus increasing the affinity of the particle for the suspending fluid and the stability of the particle dispersion.

There are two basic approaches to forming such a comb polymer. The first approach uses monomers which inherently provide the necessary side chains. Typically, such a monomer has a single polymerizable group at one end of a long chain (at least four, and preferably at least six, carbon atoms). Monomers of this type which have been found to give good results in the present processes include hexyl acrylate, 2-ethylhexyl acrylate and lauryl methacrylate. Isobutyl methacrylate and 2,2,3,4,4,4-hexafluorobutyl acrylate have also been used successfully. In some cases, it may be desirable to limit the number of side chains formed in such processes, and this can be achieved by using a mixture of monomers (for example, a mixture of lauryl methacrylate and methyl methacrylate) to form a random copolymer in which only some of the repeating units bear long side chains. In the second approach, typified by an RGP-ATRP process, a first polymerization reaction is carried out using a mixture of monomers, at least one of these monomers bearing an initiating group, thus producing a first polymer containing such initiating groups. The product of this first polymerization reaction is then subjected to a second polymerization, typically under different conditions from the first polymerization, so as to cause the initiating groups within the polymer to cause polymerization of additional monomer on to the original polymer, thereby forming the desired side chains. As with the bifunctional reagents discussed above, we do not exclude the possibility that some chemical modification of the initiating groups may be effected between the two polymerizations. In such a process, the side chains themselves do not need to be heavily branched and can be formed from a small monomer, for example methyl methacrylate.

Free radical polymerization of ethylenic or similar radical polymerizable groups attached to particles may be effected at elevated reaction temperatures, preferably 60 to 70 C, using conventional free radical initiators, such as azobis (isobutyryinitrile) (AIBN), while ATRP polymerization can be effected using the conventional metal complexes, as described in Wang, J. S., et al., Macromolecules 1995, 23, 7901, and J. Am. Chem. Soc. 1995, 117, 5614, and in Beers, K. et al., Macromolecules 1999, 32, 5772-5776. See also U.S. Pat. Nos. 5,763,548; 5,789,487; 5,807,937; 5,945,491; 4,986,015; 6,069,205; 6,071,980; 6,111,022; 6,121,371; 6,124,411; 6,137,012; 6,153,705; 6,162,882; 6,191,225; and 6,197,883. The entire disclosures of these papers and patents are herein incorporated by reference. The presently preferred catalyst for carrying out ATRP is cuprous chloride in the presence of bipyridyl (Bpy).

RGP processes of the invention in which particles bearing polymerizable groups are reacted with a monomer in the presence of an initiator will inevitably cause some formation of "free" polymer not attached to a particle, as the monomer in the reaction mixture is polymerized. The unattached polymer may be removed by repeated washings of the particles with a solvent (typically a hydrocarbon) in which the unattached polymer is soluble, or (at least in the case of metal oxide or other dense particles) by centrifuging off the treated particles from the reaction mixture (with or without the previous addition of a solvent or diluent), redispersing the particles in fresh solvent, and repeating these steps until the proportion of unattached polymer has been reduced to an acceptable level. (The decline in the proportion of unattached polymer can be followed by thermogravimetric analysis of samples of the polymer.) Empirically, it does not appear that the presence of a small proportion of unattached polymer, of the order of 1 percent by weight, has any serious deleterious effect on the electrophoretic properties of the treated particles; indeed, in some cases, depending upon the chemical natures of the unattached polymer and the suspending fluid, it may not be necessary to separate the particles having attached polymeric stabilizers from the unattached polymer before using the particles in an electrophoretic display.

As already indicated, it has been found that there is an optimum range for the amount of polymeric stabilizer which should be formed on electrophoretic particles, and that forming an excessive amount of polymer on the particles can degrade their electrophoretic characteristics. The optimum range will vary with a number of factors, including the density and size of the particles being coated, the nature of the suspending medium in which the particles are intended to be used, and the nature of polymer formed on the particles, and for any specific particle, polymer and suspending medium, the optimum range is best determined empirically. However, by way of general guidance, it should be noted that the denser the particle, the lower the optimum proportion of polymer by weight of the particle, and the more finely divided the particle, the higher the optimum proportion of polymer. In general, the particles should be coated with at least about 2, and desirably at least about 4, percent by weight of the particle. In most cases, the optimum proportion of polymer will range from about 4 to about 15 percent by weight of the particle, and typically is about 6 to about 15 percent by weight, and most desirably about 8 to about 12 percent by weight.

To incorporate functional groups for charge generation of the pigment particles, a co-monomer may be added to the polymerization reaction medium. The co-monomer may either directly charge the composite pigment particles or have interaction with a charge control agent in the display fluid to bring a desired charge polarity and charge density to the composite pigment particles. Suitable co-monomers may include vinylbenzylaminoethylamino-propyl-trimethoxysilane, methacryloxypropyltrimethoxysilane, acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like. Suitable co-monomers may also include fluorinated acrylate or methacrylate such as 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3, 3-pentafluoropropyl acrylate, 2,2,3,3-tetrafluoropropyl acrylate, 2,2,3,4,4,4-hexafluorobutyl methacrylate or 2,2,3, 3,4,4,4-heptafluorobutyl methacrylate. Alternatively, charged or chargeable groups may be incorporated into the polymer via the bifunctional stabilizer used to provide polymerizable or initiating functionality to the pigment.

Functional groups, such as acidic or basic groups, may be provided in a "blocked" form during polymerization, and may then be de-blocked after formation of the polymer. For example, since ATRP cannot be initiated in the presence of acid, if it is desired to provide acidic groups within the polymer, esters such as t-butyl acrylate or isobornyl methacrylate may be used, and the residues of these monomers within the final polymer hydrolyzed to provide acrylic or methacrylic acid residues.

When it is desired to produce charged or chargeable groups on the pigment particles and also polymeric stabilizers separately attached to the particles, it may be very convenient to treat the particles (after the silica coating) with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture. Examples of reagents which provide chargeable sites but not polymerizable or polymerization-initiating groups include 3-(trimethoxysilyl)propylamine, N-[3-(trimethoxysilyl)propyl]diethylenetriamine, N-[3-(trimethoxysilyl)propyl]ethylene and 1-[3-(trimethoxysilyl) propyl]urea; all these silane reagents may be purchased from United Chemical Technologies, Inc., Bristol, Pa., 19007. As already mentioned, an example of a reagent which provides polymerizable groups but not charged or chargeable groups is 3-(trimethoxysilyl) propyl methacrylate.

In addition to the colored organic pigment particles, various embodiments of the electrophoretic display media according to the present invention may further comprise at least one type of inorganic pigment particles. The inorganic pigment particles may also be coated with silica and a polymeric stabilizer, as described, for example, in U.S. Pat. No. 6,822,782. The white particles may be formed from an inorganic pigment, such as $TiO_2$, $ZrO_2$, $ZnO$, $Al_2O_3$, $Sb_2O_3$, $BaSO_4$, $PbSO_4$ or the like. The black particles may be formed from CI pigment black 26 or 28 or the like (e.g., manganese ferrite black spinel or copper chromite black spinel), carbon black, zinc sulfide, and combinations thereof.

Generally, the four types of particles are divided into two groups—high charge group and low charge group. In the two groups of oppositely charged particles, one group carries a stronger charge than the other group. Therefore the four types of pigment particles may also be referred to as high positive particles, high negative particles, low positive particles and low negative particles.

As an example, red particles (R) and white particles (W) may be the first group of oppositely charged particles, and in this group, the red particles are the high positive particles and the white particles are the high negative particles. The blue particles (B) and the green particles (G) may be the second group of oppositely charged particles and in this group, the blue particles are the low positive particles and the green particles are the low negative particles.

In another example, red particles may be the high positive particles; white particles may be the high negative particles; blue particles may be the low positive particles and yellow particles may be the low negative particles. It is understood that the scope of the invention broadly encompasses particles of any colors as long as the four types of particles have visually distinguishable colors.

As also shown in the FIGURE, a display layer utilizing the display fluid of the present invention has two surfaces, a first surface (17) on the viewing side and a second surface (18) on the opposite side of the first surface (17). The display fluid is sandwiched between the two surfaces. On the side of the first surface (17), there is a common electrode (15) which is a transparent electrode layer (e.g., ITO), spreading over the entire top of the display layer. On the side of the second surface (18), there is an electrode layer (16) which comprises a plurality of pixel electrodes (16a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in the FIGURE denotes a pixel. As shown, each pixel has a corresponding pixel electrode. An electric field is created for a pixel by the potential difference between a voltage applied to the common electrode and a voltage applied to the corresponding pixel electrode.

The percentages of the four types of particles in the fluid may vary. For example, one type of particles may take up 0.1% to 50%, preferably 0.5% to 15%, by volume of the electrophoretic fluid.

It is also noted that the four types of particles may have different particle sizes. Useful sizes may range from 1 nm up to about 100 μm. For example, smaller particles may have a size which ranges from about 50 nm to about 800 nm. Larger particles may have a size which is about 2 to about 50 times, and more preferably about 2 to about 10 times, the sizes of the smaller particles.

The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

In one embodiment, the charge carried by the "low charge" particles may be less than about 50%, or about 5% to about 30%, of the charge carried by the "high charge" particles. In another embodiment, the "low charge" particles may be less than about 75%, or about 15% to about 55%, the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

The magnitudes of the "high positive" particles and the "high negative" particles may be the same or different. Likewise, the magnitudes of the "low positive" particles and the "low negative" particles may be the same or different.

It is also noted that in the same fluid, the two groups of high-low charge particles may have different levels of charge differentials. For example, in one group, the low positively charged particles may have a charge intensity which is 30% of the charge intensity of the high positively charged particles and in another group, the low negatively charged particles may have a charge intensity which is 50% of the charge intensity of the high negatively charged particles.

Charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe—salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 371 or 1200 (available from Chevron Oronite Company LLC, Houston, Tex.), or Solsperse 19000 and Solsperse 17000 (available from Avecia Ltd., Blackley, Manchester, United Kingdom; "Solsperse" is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See U.S. Pat. No. 7,170,670, the entire disclosure of which is herein incorporated by reference.

EXAMPLES

The following examples are given as illustrative embodiments of the present invention, and are not intended to limit the scope of the invention.

Sample 1

30 g of organic copper phthalocyanine blue pigments were dispersed in 100 ml ethanol and 5 ml water solvent mixture. Then 1.5 g ammonia was added to raise the pH. 3 g of triethyoxysilane (TEOS) was added and the mixture was stirred at room temperature for 20 hrs. After coating, the particles were purified by a washing-centrifuging-redispersing process in ethanol three times.

The silica-coated organic pigment particles were then functionalized by mixing the silica-coated organic pigment particles with 30 g methacryloxypropyl trimethoxysilane in 150 g methyl ethyl ketone (MEK) solvent and refluxed at 60-65° C. As-functionalized particles were then purified by a washing-centrifuging-redispersing process in isopropyl alcohol (IPA) twice.

Polymer growth on the as-functionalized silica-coated pigments was completed by radical polymerization in toluene. 15 g of silanized pigment was added into 50 g toluene and sonicated for 1 hour in a three neck flask. 30 g of 2-ethylhexyl acrylate monomer was added into the flask and $N_2$ was purged into the flask for 20 minutes to remove oxygen and then the flask was heated to 65° C. 0.2 g of AIBN in toluene solution was added into the flask. After 20 hours of reaction, the particles were purified by a washing-centrifuging-redispersing process in toluene three times.

An electrophoretic ink media containing 24% polymer coated titanium oxide particles, 16 wt % of blue particles from the example of Sample 1, 5 wt % polymer coated red particles, 5 wt % of polymer coated yellow particles and 0.4% Solsperse® 17000 and other charge adjuvant in isoparaffin solvent was prepared for optical-electric performance testing.

Comparative Sample 1

The procedure used to produce Sample 1 was repeated except that copper phthalocyanine blue pigment was replaced with an inorganic cobalt aluminate blue spinel particle. Also, the encapsulated fluid contained more than 15 wt. % of the inorganic blue pigment particles.

Comparative Sample 2

The procedure used to produce Sample 1 was repeated except that organic copper phthalocyanine blue pigments were not coated with silica prior to forming the polymeric stabilizer.

Testing Method

Electrophoretic media was sealed between two transparent ITO-PET electrodes through a microcell filling-sealing technique described in U.S. Pat. No. 6,859,302. The test sample was driven by a waveform generator using the same driving sequence. Measurement of the L*a*b* optical performance are conducted using X-rite iOne spectrophotometer under a D65 illuminance setting.

The results from testing electrophoretic media containing the pigment particles according to Sample 1, Comparative Sample 1, and Comparative Sample 2, are provided below in Tables 1, 2, and 3.

TABLE 1

Electro-optical performance of electrophoretic media containing Sample 1

|    | Blue State | Red State | Yellow State |
|----|------------|-----------|--------------|
| L* | 23.62      | 25.53     | 64.94        |
| a* | −4.06      | 33.23     | 1.88         |
| b* | −22.01     | 17.52     | 44.76        |

TABLE 2

Electro-optical performance of electrophoretic media containing Comparative Sample 1

|    | Blue State | Red State | Yellow State |
|----|------------|-----------|--------------|
| L* | 28         | 26.5      | 65.7         |
| a* | −0.3       | 41.8      | 13.1         |
| b* | −14.2      | 28.5      | 60.8         |

TABLE 3

Electro-optical performance of electrophoretic media containing Comparative Sample 2

|    | Blue State | Red State | Yellow State |
|----|------------|-----------|--------------|
| L* | 25         | 25.7      | 60.2         |
| a* | −11.7      | −7.4      | −0.1         |
| b* | −22.8      | −2.2      | 40.9         |

Comparing the results of the three different electrophoretic media, the electro-optical performance of the colored particles of Sample 1 provided unexpectedly improved results. Each of the optical states, blue, red, and yellow, for Sample 1 provided values indicating much improved color separation when compared to the particles of Comparative Sample 2, which demonstrated a degradation of the red state. As expected, the blue state provided by the organic particles of Sample 1 provided superior electro-optical performance than the inorganic particles of Comparative Sample 1. Thus, by providing the organic pigment particles with a hybrid silica and polymeric stabilizer coating, improved electro-optical performance was achieved.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. An electrophoretic display comprising:
   a front and a rear electrode, at least one of the front and rear electrodes being transparent; and
   a dispersion fluid containing a plurality of pigments positioned between the front and rear electrode, the plurality of pigments comprising a first, a second, and third type of organic pigment particle, and a fourth type of inorganic pigment particle;
   the first type of organic pigment particle having a first color and a first charge polarity, the first type of organic pigment particle including a silica coating and a polymeric stabilizer, wherein the polymeric stabilizer is covalently bonded to a silane coupling group covalently bonded to the silica coating, and wherein the first type of organic pigment particles contains from about 4 to about 15 percent polymeric stabilizer by weight of the organic pigment particle;

the second type of organic pigment particle having a second color and the first charge polarity, the second color being different than the first color;

the third type of organic pigment particle having a third color and a second charge polarity, the third color being different than the first and second color, and the second charge polarity being opposite from the first charge polarity;

the fourth type of inorganic pigment particle having a fourth color and the second charge polarity, the fourth color being different than the first, second, and third color.

2. The electrophoretic display of claim 1, wherein the dispersion fluid contains a fifth type of pigment particle.

3. The electrophoretic display of claim 1, wherein the second type of organic pigment particle has a surface treatment formed via dispersion polymerization.

4. The electrophoretic display of claim 1, wherein the first, second and third types of organic pigment particle comprise an organic pigment independently selected from the group consisting of PB15:1, PB15:2, PB15:3, PB15:4, PR 254, PR122, PR149, PG36, PG58, PG7, PY138, PY150, PY151, PY154 and PY20.

5. The electrophoretic display of claim 1, wherein the first, second, and third types of organic pigment particle are independently colored red, green, blue, cyan, magenta, or yellow.

6. The electrophoretic display of claim 1, wherein the fourth type of inorganic pigment particle is black.

7. The electrophoretic display of claim 6, wherein the fourth type of inorganic pigment particle is selected from the group consisting of metal oxides, manganese ferrite black, copper chromite lack spinel, carbon black, and combinations thereof.

8. The electrophoretic display of claim 1, wherein the fourth type of inorganic pigment particle is white.

9. The electrophoretic display of claim 8, wherein the fourth type of inorganic pigment particle is selected from the group consisting of $TiO_2$, $ZrO_2$, ZnO, ZnS, $Al_2O_3$, $Sb_2O_3$, $BaSO_4$, and $PhSO_4$.

10. The electrophoretic display of claim 1, wherein the polymeric stabilizer is derived from a monomer or macromonomer.

11. The electrophoretic display of claim 10, wherein the monomer is selected from the group consisting of styrene, alpha methyl styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydroxyethyl acrylate, 2-hydroxyethyl methacrylate, dimethylaminoethyl methacrylate, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate, 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate, and 2,2,3,3,4,4,4-heptafluorobutyl methacrylate.

12. The electrophoretic display of claim 10, wherein the macromonomer contains a terminal functional group selected from the group consisting of an acrylate group, a vinyl group, or combinations thereof.

13. The electrophoretic display of claim 10, wherein the macromonomer is an acrylate terminated polysiloxane.

14. The electrophoretic display of claim 10, wherein the macromonomer comprises polyethylene oxide.

15. The electrophoretic display of claim 10, wherein the polymer stabilizer is formed using random graft polymerization, ionic random graft polymerization, or atom transfer radical polymerization.

16. The electrophoretic display of claim 10, wherein the silica coating of the first type of organic pigment particle is 0.5 to 10 nm thick.

17. The electrophoretic display of claim 1, wherein the dispersion fluid is encapsulated.

18. The electrophoretic display of claim 17, wherein the dispersion fluid is encapsulated within a microcapsule.

19. The electrophoretic display of claim 17, wherein the dispersion fluid is encapsulated within a microcell.

20. The electrophoretic display of claim 17, wherein the dispersion fluid is encapsulated within a polymer matrix.

* * * * *